United States Patent
Kim et al.

(10) Patent No.: US 7,388,856 B2
(45) Date of Patent: Jun. 17, 2008

(54) TFCI CODE WORD MAPPING IN HARD SPLIT MODE

(75) Inventors: Bong-Hoe Kim, Gyeonggi-Do (KR); Sung-Lark Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 419 days.

(21) Appl. No.: 10/844,481

(22) Filed: May 13, 2004

(65) Prior Publication Data

US 2005/0105502 A1    May 19, 2005

(30) Foreign Application Priority Data

May 13, 2003    (KR) ................ 30391/2003

(51) Int. Cl.
  *H04B 7/216* (2006.01)
(52) U.S. Cl. ............ 370/342; 370/335; 370/441
(58) Field of Classification Search .......... 370/342, 370/335, 441
  See application file for complete search history.

(56) References Cited

U.S. PATENT DOCUMENTS

| | | | |
|---|---|---|---|
| 6,341,125 B1 | 1/2002 | Hong et al. .............. 370/335 |
| 7,088,700 B2* | 8/2006 | Lee et al. ................ 370/342 |
| 7,197,027 B1* | 3/2007 | Raaf et al. .............. 370/349 |
| 2002/0115464 A1 | 8/2002 | Hwang et al. |
| 2002/0162073 A1* | 10/2002 | Choi et al. ............... 714/779 |
| 2003/0072290 A1 | 4/2003 | Hwang et al. |
| 2003/0118119 A1 | 6/2003 | Hwang et al. |
| 2003/0207696 A1 | 11/2003 | Willenegger et al. |
| 2003/0223467 A1* | 12/2003 | Kiran ..................... 370/537 |
| 2004/0261004 A1* | 12/2004 | Asghar et al. ............ 714/794 |
| 2005/0018614 A1* | 1/2005 | Kiran ..................... 370/252 |
| 2005/0079881 A1* | 4/2005 | Song ...................... 455/466 |

FOREIGN PATENT DOCUMENTS

| WO | WO 02/32016 A1 | 4/2002 |
|---|---|---|
| WO | WO 03/003602 A1 | 1/2003 |

OTHER PUBLICATIONS

RP-020127; TSG-RAN Meeting #15, "9.2.6 Enhancement on the DSCH Hard Split Mode"; Jeju, Korea, Mar. 5-8, 2002; http://www.3gpp.org/ftp/tsg_ran/tsg_ran/TSGR_15/Docs/PDFs/RP-020127.pdf.
International Search Report dated Jul. 27, 2004.

\* cited by examiner

*Primary Examiner*—Barry Taylor
(74) *Attorney, Agent, or Firm*—Ked & Associates, LLP

(57) ABSTRACT

A TFCI transmission scheme using optimal TFCI transmission bit patterns for the DPCH and DSCH in the hard split mode of the W-CDMA standard. The DPCH TFCI bits (TFCI1) and the DSCH TFCI bits (TFCI2) are mapped to their corresponding bit positions and then transmitted such that TFCI code word errors are minimized and communication reliability is improved. When the TFCI1 to TFCI2 ratio is 5:5, the TFCI transmission bit pattern has alternating TFCI1 and TFCI2 bits. For other ratios, such as 1:9, 2:8, 3:7, and 4:6, the bit patterns are obtained by considering situations where the number of TFCI bits is 6 or 7, while bit patterns for respective conjugate ratios (9:1, 8:2, 7:3, and 6:4) are obtained by reversing all 0 and 1 bits of the previously obtained bit pattern for that ratio.

17 Claims, 2 Drawing Sheets

FIG. 4

| TFCI1 : TFCI2 | TFCI code word pattern |
|---|---|
| 3:7 | 001001000100100100100010001001001 |
| 4:6 | 010010100101001010010100101 |
| 5:5 | 0101010101010101010101010101 |
| 6:4 | 101101011010110101101011010 |
| 7:3 | 110110111011011011011011101101 |

FIG. 5

| TFCI1 : TFCI2 | TFCI code word pattern |
|---|---|
| 3:7 | 001001001001001000100100010010 |
| 4:6 | 010010100101001010100101001001 |
| 5:5 | 01010101010101010101010101010101 |
| 6:4 | 101101011010110101101011010110 |
| 7:3 | 110110110110110111011011011011 |

TFCI CODE WORD MAPPING IN HARD SPLIT MODE

BACKGROUND OF THE INVENTION

1. Field of the Invention

The present invention relates to coding a TFCI (Transport Format Combination Indicator) for mobile communications, and more particularly, to TFCI code word mapping in a hard split mode.

2. Background of the Related Art

Wideband Code Division Multiple Access (W-CDMA) defines a channel structure by which various data services can be effectively provided to a plurality of users. According to W-CDMA standards, the data to be transmitted to each terminal (e.g., a mobile station) are processed by one or more transport channels (TrCH) based on commands from higher layers. Further, the data of a transport channel are mapped to one or more physical channels that are allocated to the terminals.

In more detail, the data generated at higher layers is carried over the air with transport channels, which are mapped in the physical layer to different physical channels. In addition, each transport channel is accompanied by a Transport Format Indicator (TFI) for each time event at which data is expected to arrive from the higher layers for a specific transport channel. The physical layer combines the TFI information from different transport channels into a Transport Format Combination Indicator (TFCI). The TFCI is coded and transmitted over the physical control channel to inform the receiver about the transport channels that are active for the current frame. In one example, the TFCI has a length of 10 bits and is encoded into 32 bits to be transmitted over the physical channel.

In addition, a transport channel is defined by the particular characteristics of the data to be transmitted and by the particular manner in which the data is transmitted over an air interface using a service provided to the higher layer by the physical layer. The transport channels are classified into dedicated transport channels and common transport channels. Only one type of dedicated transport channel exists, namely, a dedicated channel DCH). In contrast, there are six types of common transport channels, namely a broadcast channel (BCH), a forward access channel (FACH), a paging channel (PCH), a random access channel (RACH), a common packet channel (CPCH), and a downlink shared channel (DSCH).

The DSCH is a downlink transport channel that is shared by a plurality of terminals, and is associated with one or more downlink DCHs. Further, the DSCH is transmitted to an entire cell, or is transmitted to a portion of a cell if beam-forming antennas are used.

As the DSCH and DCH are related to each other, transmission from the base station to the terminal via the DSCH is possible. Thus, each terminal that can transmit on the DSCH has an associated single dedicated physical channel (DPCH). The associated DPCH is used for transmitting control commands for the associated uplink DPCH, if necessary.

Currently, there are two types of methods for coding the information related to the DCH and the DSCH. The first method is called a logical split mode in which a code word is formed using second order Reed-Muller coding for the TFCI information (TFCI1) of the DCH and the TFCI information (TFCI2) of the DSCH. The second method is called a hard split mode in which the TFCI information of the DCH and the TFCI information of the TFCI of the DSCH are separately coded into code words, and the bits of these two code words are mixed and then transmitted.

In other words, for the logical split mode, a 5-bit TFCI1 (which is a TFCI for the DPCH (Dedicated Physical Channel)) is encoded together with a 5-bit TFCI2 (which is a TFCI for the DSCH (Downlink Shared Channel)) and transmitted over the DPCCH (Dedicated Physical Control Channel). In contrast, for the hard split mode, the TFCI1 and TFCI2 are encoded separately and transmitted over the DPCCH. Namely, in one example, a (32,6) second order Reed-Muller code is used for the logical split mode, while a (16,5) first order Reed-Muller code is used for the hard split mode.

Further, other various TFCI1 to TFCI2 ratio combinations (e.g., 3:7, 4:6, 6:4, 7:3) are used. For example, if 10 input information bits (i.e., TFCI bits) are divided in a 1:9 ratio, then 30 coded output symbols (i.e., forming a TFCI code word) are divided in a 3:27 ratio. That is, although a total of 32 coded bits are output based on the inputted information bits, the last two transport combination information bits are not transmitted due to a limitation in the total number of the TFCI fields that are actually transmitted. In other examples, if the 10 input information bits are divided in a 2:8 ratio, then the 30 coded output symbols are divided in a 6:24 ratio; if the 10 input information bits are divided in a 3:7 ratio, then the 30 coded output symbols are divided in a 9:21 ratio; and if the 10 input information bits are divided in a 4:6 ratio, then the 30 coded output symbols are divided in a 12:18 ratio.

Currently, the bit positions $j_1$ (=bit positions for the TFCI1 bits) and $j_2$ (=bit positions for the TFCI2 bits) are obtained by the following Equations 1a through 1d:

$$\text{If } k \neq 5, \quad j_1 = \left\lfloor \frac{32}{3 \times \min(k, 10-k) + 1} \times (i_1 + 1) + \frac{1}{2} \right\rfloor - 1 \tag{1a}$$

$$\text{If } k = 5, \quad j_2 = i_2 + \left\lfloor \frac{32 \times \min(k, 10-k) + 1}{32 - (3 \times \min(k, 10-k) + 1)} \times \left(i_2 + \frac{1}{2}\right) \right\rfloor \tag{1b}$$

$$j_1 = 2 \times i_1 \tag{1c}$$

$$j_2 = 2 \times i_2 + 1 \tag{1d}$$

Here, $i_1=0, \ldots, 3k$ and $i_2=0, \ldots 30-3k$, whereby, "k" indicates the number of the corresponding TFCI1 bits (for example, if the ratio is 6:4, k=6).

In a 32 bit code word, $j_1$ and $j_2$ must have values between 0 and 31. However, the above bit position equations do not produce valid bit position for each TFCI ratio.

As such, the generation of these invalid bit positions creates errors in the TFCI code words generated therefrom. As a result, the reliability of DPCH or DSCH transmissions is undesirably decreased.

SUMMARY OF THE INVENTION

An object of the invention is to solve at least the above problems and/or disadvantages and to provide at least the advantages described hereinafter.

Another object of the present invention is to provide a novel TFCI transmission scheme that performs mapping of optimal code word patterns for TFCI1 and TFCI2 to minimize TFCI code word errors to thus improve communication reliability.

To achieve these and other objects, the present invention provides a novel method of coding a transport format combination indicator (TFCI) including calculating valid bit positions of a first coded TFCI word such that invalid bit positions located outside a length of the coded TFCI are excluded. Further, the valid bit positions are those bits positions having values between 0 and 31. The present invention also provides a novel encoder.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements wherein:

FIG. 4 is a table illustrating exemplary transmission patterns of each type of TFCI1 to TFCI2 ratio for transmitting TFCI code words; and FIG. 5 is a table illustrating additional exemplary transmission patterns of each type of TFCI1 to TFCI2 ratio for transmitting TFCI code words.

BEST MODE OF THE INVENTION

The present inventors discovered that certain types of code words cannot be mapped using the related art bit position equations, such as when k=6 or 7, for example. That is, as shown in the following Tables 1 and 2, bit positions greater than 31 (i.e., invalid bit positions) are generated for $j_1$ (i.e., $j_1 > 31$) when k=6 or k=7.

TABLE 1

| | TFCI bit position if k = 6 | | | | | | | | | | | | |
|---|---|---|---|---|---|---|---|---|---|---|---|---|---|
| $j_1$ | 1 | 4 | 6 | 9 | 11 | 14 | 16 | 19 | 21 | 24 | 26 | 29 | 31 |
| | 33 | 36 | 38 | 41 | 43 | 46 | | | | | | | |
| $j_2$ | 0 | 2 | 3 | 5 | 7 | 8 | 10 | 12 | 13 | 15 | 17 | 18 | 20 |
| | TFCI bit position if k = 7 | | | | | | | | | | | | |
| $j_1$ | 2 | 5 | 9 | 12 | 15 | 18 | 21 | 25 | 28 | 31 | 34 | 37 | 41 |
| | 44 | 47 | 50 | 53 | 57 | 60 | 63 | 66 | 69 | | | | |
| $j_2$ | 0 | 1 | 3 | 4 | 6 | 7 | 8 | 10 | 11 | 13 | | | |

For example, if the TFCI code ratio is 6:4, the following result is obtained for $j_1$ when $i_1=14$ and k=6, and for $j_2$ when $i_2=1$ and k=6.

$$j_1 = \left\lfloor \frac{32}{3 \times \min(6, 10-6)+1} \times (14+1) + \frac{1}{2} \right\rfloor - 1 \quad j_2 = 1 + \left\lfloor \frac{3 \times \min(6, 10-6)+1}{32 - (3 \times \min(6, 10-6)+1)} \times \left(1 + \frac{1}{2}\right) \right\rfloor$$

$$j_1 = \left\lfloor \frac{32}{3 \times \min(6, 4)+1} \times (15) + \frac{1}{2} \right\rfloor - 1 \quad j_2 = 1 + \left\lfloor \frac{3 \times \min(6, 4)+1}{32 - (3 \times \min(6, 4)+1)} \times \left(1 + \frac{1}{2}\right) \right\rfloor$$

$$j_1 = \left\lfloor \frac{32}{3 \times 4+1} \times (15) + \frac{1}{2} \right\rfloor - 1 \quad j_2 = 1 + \left\lfloor \frac{3 \times 4+1}{32 - (3 \times 4+1)} \times \left(1 + \frac{1}{2}\right) \right\rfloor$$

$$j_1 = \left\lfloor \frac{32}{13} \times (15) + \frac{1}{2} \right\rfloor - 1 \quad j_2 = 1 + \left\lfloor \frac{13}{32-(13)} \times (1.5) \right\rfloor$$

$$j_1 = \lfloor 37.4 \rfloor - 1 \quad j_2 = 1 + \left\lfloor \frac{13}{19} \times (1.5) \right\rfloor \quad j_2 = 1 + \lfloor 1.03 \rfloor$$

$$j_1 = 37 - 1 = 36 \quad j_2 = 1 + 1 = 2$$

As shown in Table 1, for $i_1=14$ and k=6 the bit position ($j_1$) for TFCI1 is 36, which is outside the length (32 bits in this example) for the TFCI code word. Note, $i_1=13, 15, 16, 17$ and 18 also result in invalid bit positions. The bit position $j_2$) for TFC12 is 2.

According to the TFCI transmission scheme of the present invention, optimal TFCI transmission bit patterns are formed for TFCI transmission of DPCH and DSCH in the hard split mode, and the DPCH TFCI bits (TFCI1) and the DSCH TFCI bits (TFCI2) are mapped to the appropriate bit positions of the formed bit patterns for transmission.

Hereinafter, a TFCI transmission scheme according to the embodiments of the present invention will be explained with reference to the attached drawings.

Figure 1:
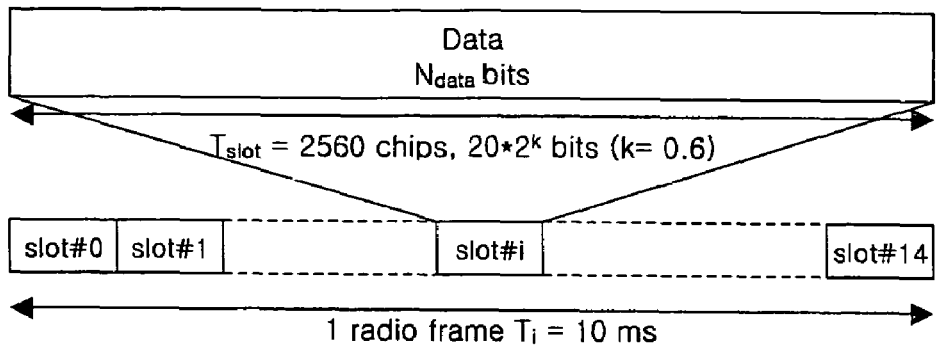
FIG. 1 is a block diagram illustrating a DSCH frame structure.

Turning first to FIG. 1, which illustrates one example of a frame structure for a DSCH. As shown, each frame is 10 ms in length and has 15 slots. In addition, each slot has a length of $T_{slot}=2560$ chips.

Further, a single DSCH is shared by a plurality of terminals through the use of time division scheduling performed in units of a single frame (e.g., 10 ms) or multiple frames. Thus, the DSCH allows a plurality of terminals to commonly share a high-speed channel by using common channelizing code resources for relatively low activity and bursty traffic.

The primary method of commonly sharing channelization code resources is to allocate code resources to one terminal at one time in the time domain. However, even if such method is used, there are limitations on performing code multiplexing. In other words, having one or more terminals use a portion of the codes allocated for the DSCH to simultaneously transmit DSCH data is helpful in increasing the granularity in the payload size being supported. That is, to support flexibility of more TFCS (transport format combination sets), more TFCIs are needed (i.e., the TFCI coded word is changed from 16 bits to 32 bits, for example). Thus, the power control for the DSCH is performed in association with the terminals that occupy the DSCH.

In addition, considering a power control process, the terminal detects the power of the DCH transmitted from the base station and based upon the detected power level, generates transmission power control (TPC) commands that are sent to the base station. The base station then adjusts the power level of the DCH in accordance with the TPC commands received from the terminal. Also, the base station can update the power level of the DSCH associated with the DCH with a separate TPC for the downlink DSCH. The reason why the power of the DSCH is related to the power of the DCH is because when the DSCH is common to many terminals, a single terminal may occupy the DSCH. Further, the DCH periodically transmits a Pilot for fast power control and allocates to each terminal that occupies the DSCH to transmit control information on the DSCH, where this is referred to as an associated DCH.

In addition, as noted above, because the DSCH and DCH are related to each other, transmission from the base station to the terminal via the DSCH is possible. Thus, each terminal that can transmit on the DSCH has an associated single dedicated physical channel DPCH). This associated DPCH is used for transmitting control commands for the associated uplink DPCH, if necessary.

Figure 2:
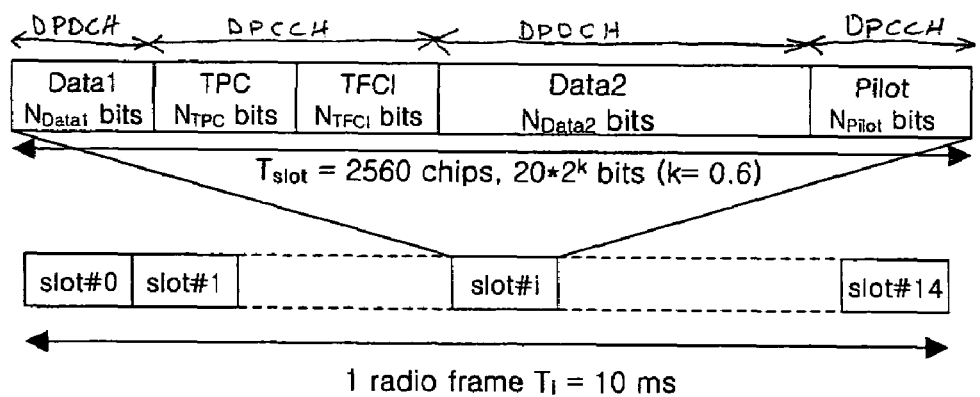
FIG. 2 is a block diagram illustrating a downlink DPCH frame structure.

Turning next to FIG. 2, which illustrates a frame structure for a downlink DPCH. As shown in FIG. 2, each frame has a length of 10 ms and includes 15 slots. Each slot has a length of $T_{slot}$=2560 chips that is equivalent to one power control period. In one downlink DPCH, dedicated data (namely, DCH) formed in Layer 2 and its higher layers, and control information (such as a Pilot, TPC commands, and TFCI) formed in Layer 1 are multiplexed together in the time domain and transmitted. Thus, the downlink DPCH can be viewed as a time multiplexed structure including a dedicated physical data channel DPDCH) and a dedicated physical control channel DPCCH).

The parameter k in FIG. 2 determines the total number of bits per downlink DPCH slot. It is related to the spreading factor SF of the physical channel as $SF=512/2^k$. The spreading factor may thus range from 512 down to 4. The exact number of bits of the different downlink DPCH fields ($N_{pilot}$, $N_{TPC}$, $N_{TFCI}$, $N_{data1}$ and $N_{data2}$) is given in Table 2. What slot format to use is configured by higher layers and can also be reconfigured by higher layers.

There are basically two types of downlink Dedicated Physical Channels; those that include TFCI (e.g. for several simultaneous services) and those that do not include TFCI (e.g. for fixed-rate services). These types are reflected by the duplicated rows of table 11. It is the UTRAN that determines if a TFCI should be transmitted and it is mandatory for all UEs to support the use of TFCI in the downlink. In compressed frames, a different slot format is used compared to normal mode. There are two possible compressed slot formats that are labelled A and B. Slot format B shall be used in frames compressed by spreading factor reduction and slot format A shall be used in frames compressed by puncturing or higher layer scheduling. The channel bit and symbol rates given in Table 2 are the rates immediately before spreading.

TABLE 2

DPDCH and DPCCH fields

| Slot Format #i | Channel Bit Rate (kbps) | Channel Symbol Rate (ksps) | SF | Bits/ Slot | DPDCH Bits/Slot | | DPCCH Bits/Slot | | | Transmitted slots per radio frame $N_{Tr}$ |
|---|---|---|---|---|---|---|---|---|---|---|
| | | | | | $N_{Data1}$ | $N_{Data2}$ | $N_{TPC}$ | $N_{TFCI}$ | $N_{Pilot}$ | |
| 0 | 15 | 7.5 | 512 | 10 | 0 | 4 | 2 | 0 | 4 | 15 |
| 0A | 15 | 7.5 | 512 | 10 | 0 | 4 | 2 | 0 | 4 | 8-14 |
| 0B | 30 | 15 | 256 | 20 | 0 | 8 | 4 | 0 | 8 | 8-14 |
| 1 | 15 | 7.5 | 512 | 10 | 0 | 2 | 2 | 2 | 4 | 15 |
| 1B | 30 | 15 | 256 | 20 | 0 | 4 | 4 | 4 | 8 | 8-14 |
| 2 | 30 | 15 | 256 | 20 | 2 | 14 | 2 | 0 | 2 | 15 |
| 2A | 30 | 15 | 256 | 20 | 2 | 14 | 2 | 0 | 2 | 8-14 |
| 2B | 60 | 30 | 128 | 40 | 4 | 28 | 4 | 0 | 4 | 8-14 |
| 3 | 30 | 15 | 256 | 20 | 2 | 12 | 2 | 2 | 2 | 15 |
| 3A | 30 | 15 | 256 | 20 | 2 | 10 | 2 | 4 | 2 | 8-14 |
| 3B | 60 | 30 | 128 | 40 | 4 | 24 | 4 | 4 | 4 | 8-14 |
| 4 | 30 | 15 | 256 | 20 | 2 | 12 | 2 | 0 | 4 | 15 |
| 4A | 30 | 15 | 256 | 20 | 2 | 12 | 2 | 0 | 4 | 8-14 |
| 4B | 60 | 30 | 128 | 40 | 4 | 24 | 4 | 0 | 8 | 8-14 |
| 5 | 30 | 15 | 256 | 20 | 2 | 10 | 2 | 2 | 4 | 15 |
| 5A | 30 | 15 | 256 | 20 | 2 | 8 | 2 | 4 | 4 | 8-14 |
| 5B | 60 | 30 | 128 | 40 | 4 | 20 | 4 | 4 | 8 | 8-14 |
| 6 | 30 | 15 | 256 | 20 | 2 | 8 | 2 | 0 | 8 | 15 |
| 6A | 30 | 15 | 256 | 20 | 2 | 8 | 2 | 0 | 8 | 8-14 |
| 6B | 60 | 30 | 128 | 40 | 4 | 16 | 4 | 0 | 16 | 8-14 |
| 7 | 30 | 15 | 256 | 20 | 2 | 6 | 2 | 2 | 8 | 15 |
| 7A | 30 | 15 | 256 | 20 | 2 | 4 | 2 | 4 | 8 | 8-14 |
| 7B | 60 | 30 | 128 | 40 | 4 | 12 | 4 | 4 | 16 | 8-14 |
| 8 | 60 | 30 | 128 | 40 | 6 | 28 | 2 | 0 | 4 | 15 |
| 8A | 60 | 30 | 128 | 40 | 6 | 28 | 2 | 0 | 4 | 8-14 |
| 8B | 120 | 60 | 64 | 80 | 12 | 56 | 4 | 0 | 8 | 8-14 |
| 9 | 60 | 30 | 128 | 40 | 6 | 26 | 2 | 2 | 4 | 15 |
| 9A | 60 | 30 | 128 | 40 | 6 | 24 | 2 | 4 | 4 | 8-14 |
| 9B | 120 | 60 | 64 | 80 | 12 | 52 | 4 | 4 | 8 | 8-14 |
| 10 | 60 | 30 | 128 | 40 | 6 | 24 | 2 | 0 | 8 | 15 |
| 10A | 60 | 30 | 128 | 40 | 6 | 24 | 2 | 0 | 8 | 8-14 |
| 10B | 120 | 60 | 64 | 80 | 12 | 48 | 4 | 0 | 16 | 8-14 |

TABLE 2-continued

DPDCH and DPCCH fields

| Slot Format #i | Channel Bit Rate (kbps) | Channel Symbol Rate (ksps) | SF | Bits/Slot | DPDCH Bits/Slot | | DPCCH Bits/Slot | | | Transmitted slots per radio frame |
|---|---|---|---|---|---|---|---|---|---|---|
| | | | | | $N_{Data1}$ | $N_{Data2}$ | $N_{TPC}$ | $N_{TFCI}$ | $N_{Pilot}$ | $N_{Tr}$ |
| 11   | 60   | 30  | 128 | 40   | 6   | 22  | 2  | 2    | 8  | 15   |
| 11A  | 60   | 30  | 128 | 40   | 6   | 20  | 2  | 4    | 8  | 8-14 |
| 11B  | 120  | 60  | 64  | 80   | 12  | 44  | 4  | 4    | 16 | 8-14 |
| 12   | 120  | 60  | 64  | 80   | 12  | 48  | 4  | 8*   | 8  | 15   |
| 12A  | 120  | 60  | 64  | 80   | 12  | 40  | 4  | 16*  | 8  | 8-14 |
| 12B  | 240  | 120 | 32  | 160  | 24  | 96  | 8  | 16*  | 16 | 8-14 |
| 13   | 240  | 120 | 32  | 160  | 28  | 112 | 4  | 8*   | 8  | 15   |
| 13A  | 240  | 120 | 32  | 160  | 28  | 104 | 4  | 16*  | 8  | 8-14 |
| 13B  | 480  | 240 | 16  | 320  | 56  | 224 | 8  | 16*  | 16 | 8-14 |
| 14   | 480  | 240 | 16  | 320  | 56  | 232 | 8  | 8*   | 16 | 15   |
| 14A  | 480  | 240 | 16  | 320  | 56  | 224 | 8  | 16*  | 16 | 8-14 |
| 14B  | 960  | 480 | 8   | 640  | 112 | 464 | 16 | 16*  | 32 | 8-14 |
| 15   | 960  | 480 | 8   | 640  | 120 | 488 | 8  | 8*   | 16 | 15   |
| 15A  | 960  | 480 | 8   | 640  | 120 | 480 | 8  | 16*  | 16 | 8-14 |
| 15B  | 1920 | 960 | 4   | 1280 | 240 | 976 | 16 | 16*  | 32 | 8-14 |
| 16   | 1920 | 960 | 4   | 1280 | 248 | 1000| 8  | 8*   | 16 | 15   |
| 16A  | 1920 | 960 | 4   | 1280 | 248 | 992 | 8  | 16*  | 16 | 8-14 |

The number of bits ($N_{data1}$, $N_{TPC}$, $N_{TFCI}$, $N_{data2}$, $N_{pilot}$) in the downlink DPCH fields depends on the slot format being used. In addition, the TFCI field includes channel quality information, such as data rates and associated channel coding methods. The TFCI is the control information indicating the information characteristics of the data transmitted over the DSCH and DPDCH.

Further, the TFCI has a length of 10 bits and is encoded into 32 bits. Namely, information is expressed with 10 bits, and the 10-bit information is encoded into 32 bits to be transmitted over the physical channel.

When data for a single terminal is transmitted on the DSCH, the DSCH channel information is transmitted together with the DCH channel information by using the TFCI field of the DPCCH. To achieve this, the TFCI field must be split into two portions, one portion for the DCH and the other portion for the DSCH, for each slot.

Figure 3:
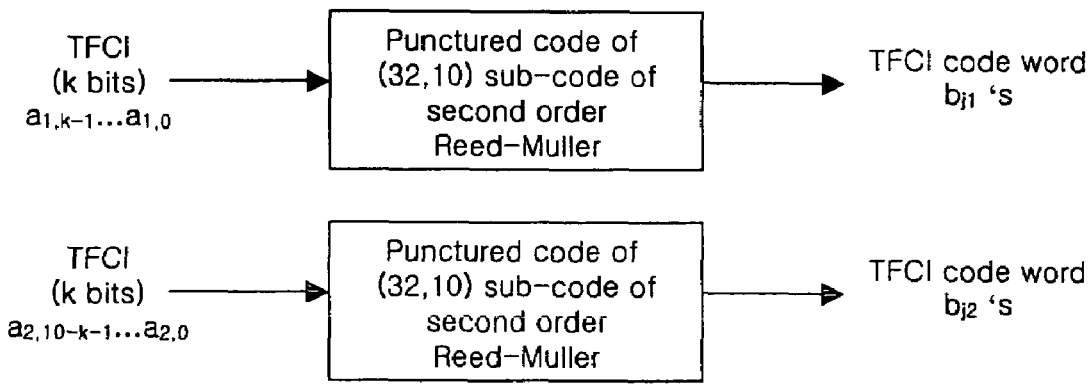
FIG. 3 is a block diagram for explaining a TFCI coding method.

Next, FIG. 3 is a block diagram to explain a TFCI coding method. If one of the DCH is associated with a DSCH, the TFCI code word may be split in such a way that the code word relevant for TFCI activity indication is not transmitted from every cell. The use of such a functionality shall be indicated by higher layer signalling. The TFCI is encoded by using punctured code of (32,10) sub-code of second order Reed-Muller code. The coding procedure is as shown in FIG. 3. The code words of the punctured code of (32,10) sub-code of second order Reed-Muller code are linear combinations of basis sequences generated by puncturing 10 basis sequences defined in Table 3.

TABLE 3

Basis sequences for (32, 10) TFCI code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0  | 1 | 0 | 0 | 0 | 0 | 1 | 0 | 0 | 0 | 0 |
| 1  | 0 | 1 | 0 | 0 | 0 | 1 | 1 | 0 | 0 | 0 |
| 2  | 1 | 1 | 0 | 0 | 0 | 1 | 0 | 0 | 0 | 1 |
| 3  | 0 | 0 | 1 | 0 | 0 | 1 | 1 | 0 | 1 | 1 |
| 4  | 1 | 0 | 1 | 0 | 0 | 1 | 0 | 0 | 0 | 1 |
| 5  | 0 | 1 | 1 | 0 | 0 | 1 | 0 | 0 | 1 | 0 |
| 6  | 1 | 1 | 1 | 0 | 0 | 1 | 0 | 1 | 0 | 0 |
| 7  | 0 | 0 | 0 | 1 | 0 | 1 | 0 | 1 | 1 | 0 |
| 8  | 1 | 0 | 0 | 1 | 0 | 1 | 1 | 1 | 1 | 0 |
| 9  | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |

TABLE 3-continued

Basis sequences for (32, 10) TFCI code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

As shown in FIG. 3, the first set of TFCI information bits ($a_{1,0}$, $a_{1,1}$, $a_{1,2}$, $a_{1,3}$, . . . , $a_{1,k-1}$ where $a_{1,0}$ is LSB and $a_{1,k-1}$ is MSB) shall correspond to the TFC index (expressed in unsigned binary form) defined by the RRC layer to reference the TFC of the DCH CCTrCH in the associated DPCH radio frame. The second set of TFCI information bits ($a_{2,0}$, $a_{2,1}$, $a_{2,2}$, $a_{2,3}$, . . . , $a_{2,10-k-1}$ where $a_{2,0}$ is LSB and $a_{2,10-k-1}$ is MSB) shall correspond to the TFC index (expressed in unsigned binary form) defined by the RRC layer to reference the TFC of the associated DSCH CCTrCH in the corresponding PDSCH radio frame. In addition, If one of the DCH is associated with a DSCH, the TFCI code word may be split in such a way that the code word relevant for TFCI activity indication is not transmitted from every cell. The use of such a functionality shall be indicated by higher layer signalling. The TFCI is encoded by using punctured code of (32,10) sub-code of second order Reed-Muller code. The coding procedure is as shown in FIG. 3.

That is, the first TFCI information bit set $a_{1,0}$, . . . $a_{1,k-1}$ includes TFCI bits for the DPCH (TFCI1), and the second TFCI information bit set $a_{2,0}$, . . . $a_{2,10-k-1}$ includes TFCI bits for the DSCH (TFCI2). Each of these information bit sets for the DPCH and the DSCH is coded by using a punctured code of the (32,10) sub-code of the second order Reed-Muller code, for example, and TFCI code word bits $b_{j1}$ and $b_{j2}$ are outputted, respectively. These outputted TFCI code word bits can expressed by the following Equations 2a and 2b.

$$b_{j_1} = \sum_{n=0}^{k-1} (a_{1,n} \times M_{\pi_1(k,j_1),\pi_2(k,n)}) \bmod 2 \quad (2a)$$

$$b_{j_2} = \sum_{n=0}^{10-k-1} (a_{2,n} \times M_{\pi_1(10-k,j_2),\pi_2(10-k,n)}) \bmod 2 \quad (2b)$$

Here, $i_1$=0, . . . , 3k and $i_2$=0, 1, . . . 30-3k, whereby, "k" indicates the number of the corresponding TFCI1 bits.

Also, the functions $\pi_1$, $\pi_2$ are indicated by Table 4 below:

TABLE 4

$\pi_1$, $\pi_2$ functions

| m | $\pi_1$(m, i) for i = 0, . . ., 3 × m | $\pi_2$(m, n) for n = 0, . . ., m − 1 |
|---|---|---|
| 3 | 0, 1, 2, 3, 4, 5, 6, 8, 9, 11 | 0, 1, 2 |
| 4 | 3, 4, 5, 6, 7, 8, 9, 10, 11, 12, 13, 14, 15 | 0, 1, 2, 3 |
| 5 | 0, 1, 2, 3, 4, 5, 6, 7, 8, 9, 10, 11, 12, 13, 14, 30 | 0, 1, 2, 3, 5 |
| 6 | 0, 1, 2, 3, 4, 5, 7, 8, 9, 12, 15, 18, 21, 23, 25, 27, 28, 29, 30 | 0, 1, 2, 3, 4, 5 |

TABLE 4-continued $\pi_1$, $\pi_2$ functions

| m | $\pi_1$(m, i) for i = 0, . . ., 3 × m | $\pi_2$(m, n) for n = 0, . . ., m − 1 |
|---|---|---|
| 7 | 0, 1, 2, 3, 4, 5, 6, 7, 9, 10, 11, 13, 14, 15, 17, 20, 21, 22, 24, 25, 28, 29 | 0, 1, 2, 3, 4, 6, 7 |

A basic transmission unit of the physical channel is a radio frame, which has a length of 10 ms, for example, and includes 15 time slots. Each time slot has fields for transmitting the TFCI, and has 2 TFCI transmission fields. Thus, the number of TFCI transmission code bits that can be transmitted for one radio frame is 30. As noted above, although a total of 32 coded bits are output based upon the inputted information bits, the last two transport combination information bits are not transmitted due to a limitation in the total number of the TFCI fields that are actually transmitted.

In other words, the length of the TFCI code word generated in the manner above is 30 bits, upon 2-bit puncturing from 32 bits. However, $j_1$ and $j_2$ must have values between 0 and 31.

Turning now to the first embodiment of the present invention, which uses the following Equations 3a and 3b to determine the proper bit positions for $j_1$ and $j_2$.

$$j_1 = \left\lfloor \frac{32}{32 - 3k + 1} \times \left(i_1 + \frac{1}{2}\left(1 + \left\lfloor \frac{k}{6} \right\rfloor\right)\right) + \frac{1}{2} \right\rfloor - 1 \quad (3a)$$

$$j_2 = \left\lfloor \frac{32}{3k + 1} \times \left(i_2 + 1 - \frac{1}{2}\left\lfloor \frac{k}{6} \right\rfloor\right) + \frac{1}{2} \right\rfloor - 1 \quad (3b)$$

Here, $i_1$=0, . . . , 30-3k and $i_2$=0, . . . , 3k, whereby, "k" indicates the total number of corresponding TFCI1 bits.

For example, if the TFCI code ratio is 6:4, the following result is obtained for $j_1$ when $i_1$=12, and k=6.

$$j_1 = \left\lfloor \frac{32}{32 - 3 \times 6 + 1} \times \left(12 + \frac{1}{2}\left(1 + \left\lfloor \frac{6}{6} \right\rfloor\right)\right) + \frac{1}{2} \right\rfloor - 1$$

$$j_1 = \left\lfloor \frac{32}{15} \times \left(12 + \frac{1}{2}(2)\right) + \frac{1}{2} \right\rfloor - 1$$

$$j_1 = \left\lfloor \frac{32}{15} \times (13) + \frac{1}{2} \right\rfloor - 1$$

$$j_1 = \lfloor 27.7 \rfloor - 1$$

-continued $$j_1 = 26$$

In addition, when i1=0, and k=6.

$$j_1 = \left\lfloor \frac{32}{32 - 3 \times 6 + 1} \times \left(0 + \frac{1}{2}\left(1 + \left\lfloor \frac{6}{6} \right\rfloor\right)\right) + \frac{1}{2} \right\rfloor - 1$$

$$j_1 = \left\lfloor \frac{32}{15} \times \left(0 + \frac{1}{2}(2)\right) + \frac{1}{2} \right\rfloor - 1$$

$$j_1 = \left\lfloor \frac{32}{15} \times (1) + \frac{1}{2} \right\rfloor - 1$$

$$j_1 = \lfloor 2.63 \rfloor - 1$$

$$j_1 = 1$$

The values for $j_2$ are calculated in a similar manner. Thus, according to the above novel equation, the proper bit position ($j_1$) is calculated.

FIG. 4 illustrates values calculated according to the above equation. That is, FIG. 4 is a table showing exemplary transmission patterns of each type of TFCI1 to TFCI2 ratio for transmitting TFCI code words. In the TFCI bit pattern of FIG. 4, a "0" bit indicates those bit positions where TFCI2 is inserted, and a "1" bit indicates those bit positions where TFCI1 is inserted. Note that for positions $j_1$=26 and $j_1$=1 calculated above for the ratio 6:4, FIG. 4 illustrates a bit "1" in these positions for the TFCI1.

Further, as shown in FIG. 4, for TFCI1 to TFCI2 ratios of 3:7 and 7:3, the TFCI bit patterns are opposite to each other, and for the TFCI1 to TFCI2 ratios of 4:6 and 6:4, the TFCI bit patterns are also opposite to each other. As such, upon generating a bit pattern for a particular TFCI1:TFCI2 ratio (such as 4:6), the bit pattern for its conjugate (reverse) ratio (such as 6:4) can be easily created by merely reversing each 0 bit and 1 bit of the bit pattern generated for the particular ratio (4:6) to either a 1 bit or 0 bit, respectively.

Thus according to the present invention, bit positions greater than 31 when k=6 or k=7 are prevented from being generated. In particular, a fractional term "k/6" is used so that the situations for k=6 and k=7 (i.e., when the number of TFCI bits is 6 or 7) are considered when calculating the bit positions for the TFCI1 and TFCI2 bits.

In the second embodiment of the present invention, $j_1$ and $j_2$ are obtained by the following Equations 4a and 4b.

$$j_1 = \left\lfloor \frac{32}{32 - 3k + 1} \times \left(i_1 + \frac{1}{2}\left(1 + \left\lfloor \frac{k}{6} \right\rfloor\right)\right) - \frac{1}{2} \right\rfloor \quad (4a)$$

$$j_2 = \left\lfloor \frac{32}{3k + 1} \times \left(i_2 + 1 - \frac{1}{2}\left\lfloor \frac{k}{6} \right\rfloor\right) - \frac{1}{2} \right\rfloor \quad (4b)$$

Here, $i_1$=0, ..., 30-3k and $i_2$=0, ..., 3k, whereby, "k" indicates the total number of corresponding TFCI1 bits.

Again, invalid bit positions (i.e., bit positions greater than 31 when k=6 or k=7) are prevented from being generated.

In the third embodiment of the present invention, $j_1$ and $j_2$ are obtained by the following Equations 5a and 5b.

$$j_1 = i_1 + \left\lfloor \frac{3k + 1}{32 - (3k + 1)} \times \left(i_1 + \frac{1}{2}\right) + \frac{16}{32 - (3k + 1)}\left\lfloor \frac{k}{6} \right\rfloor \right\rfloor \quad (5a)$$

$$j_2 = \left\lfloor \frac{32}{3k + 1} \times \left(i_2 + 1 - \frac{1}{2}\left\lfloor \frac{k}{6} \right\rfloor\right) + \frac{1}{2} \right\rfloor - 1 \quad (5b)$$

Here, $i_1$=0, ..., 30-3k and $i_2$=0, ..., 3k, whereby, "k" indicates the total number of corresponding TFCI1 bits.

Again, invalid bit positions (i.e., bit positions greater than 31 when k=6 or k=7) are prevented from being generated.

In the fourth embodiment of the present invention, $j_1$ and $j_2$ are obtained by the following Equations 6a-1 and 6b-1.

$$j_1 = \left\lfloor \frac{32}{32 - (3k + 1)} \times \left(i_1 + \frac{1}{2}\left(1 + \left\lfloor \frac{k}{5} \right\rfloor\right)\right) + \frac{1}{2} \right\rfloor - 1 \quad (6a\text{-}1)$$

$$j_2 = \left\lfloor \frac{32}{3k + 1} \times \left(i_2 + 1 - \frac{1}{2}\left\lfloor \frac{k}{5} \right\rfloor\right) + \frac{1}{2} \right\rfloor - 1 \quad (6b\text{-}1)$$

Here, $i_1$=0, ..., 30-3k and $i_2$=0, ..., 3k, whereby, "k" indicates the total number of corresponding TFCI1 bits. In particular, a fractural term "k/5" is used so the situations for k=6 and k=7 are considered.

Thus, invalid bit positions (i.e., bit positions greater than 31 when k=6 or k=7) are prevented from being generated.

Note also that as discussed above, the bit positions for the conjugate ratio of the TFCI1:TFCI1 may be calculated by switching the equations for $j_1$ and $j_2$. In this example, the above equations would be switched to:

$$j_1 = \left\lfloor \frac{32}{3k + 1} \times \left(i_1 + 1 - \frac{1}{2}\left\lfloor \frac{k}{5} \right\rfloor\right) + \frac{1}{2} \right\rfloor - 1 \quad (6a\text{-}2)$$

$$j_2 = \left\lfloor \frac{32}{32 - (3k + 1)} \times \left(i_2 + \frac{1}{2}\left(1 + \left\lfloor \frac{k}{5} \right\rfloor\right)\right) + \frac{1}{2} \right\rfloor - 1 \quad (6b\text{-}2)$$

Here, $i_1$=0, ..., 3k and $i_2$=0, ..., 30-3k, whereby, "k" indicates the total number of corresponding TFCI1 bits. That is, the conjugate TFCI ratio is found by switching the bit position equations.

In the seventh embodiment of the present invention, $j_1$ and $j_2$ are obtained by the following Equations 7a and 7b.

$$j_1 = \left\lfloor \frac{32}{32 - (3k + 1)} \times \left(i_1 + \frac{1}{2}\left(1 + \left\lfloor \frac{k}{5} \right\rfloor\right)\right) - \frac{1}{2} \right\rfloor \quad (7a)$$

$$j_2 = \left\lfloor \frac{32}{3k + 1} \times \left(i_2 + 1 - \frac{1}{2}\left\lfloor \frac{k}{5} \right\rfloor\right) - \frac{1}{2} \right\rfloor \quad (7b)$$

Here, $i_1$=0, ..., 30-3k and $i_2$=0, ..., 3k, whereby, "k" indicates the total number of corresponding TFCI1 bits.

Therefore, invalid bit positions (i.e., bit positions greater than 31 when k=6 or k=7) are prevented from being generated.

In the eighth embodiment of the present invention, $j_1$ and $j_2$ are obtained by the following Equations 8a and 8b.

$$j_1 = i_1 + \left\lfloor \frac{3k+1}{32-(3k+1)} \times \left(i_1 + \frac{1}{2}\right) + \frac{16}{32-(3k+1)} \left\lfloor \frac{k}{5} \right\rfloor \right\rfloor \quad (8a)$$

$$j_2 = \left\lfloor \frac{32}{3k+1} \times \left(i_2 + 1 - \frac{1}{2}\left\lfloor \frac{k}{5} \right\rfloor\right) + \frac{1}{2} \right\rfloor - 1 \quad (8b)$$

Here, $i_1=0, \ldots, 30-3k$ and $i_2=0, \ldots, 3k$, whereby, "k" indicates the total number of corresponding TFCI1 bits. Again, invalid bit positions (i.e., bit positions greater than 31 when k=6 or k=7) are prevented from being generated.

In the seventh embodiment of the present invention, $j_1$ and $j_2$ are obtained in the following manner.

If X=32, $e_{plus}$=32, $e_{minus1}$=32-(k*3+1), $e_{minus2}$=3k+1, $e_{ini1}$=16*(1+floor(k/6))-(32-(3k+1))/2, and $e_{ini2}$=16*(2-floor(k/6))-(3k+1)/,2, then the following algorithm is used to determine the TFCI1 and TFCI2 positions.

```
e₂ = e_ini 1      -- initial error between current and desired puncturing ratio
e₂ = e_ini 2      -- initial error between current and desired puncturing ratio
m = 1             -- index of current bit
do while m ≤ X_i
    e₁ = e₁ - e_minus 1    -- update error
    e₂ = e₂ - e_minus 2    -- update error
    if e₁ ≦ 0 then         -- check if bit number m should be TFCI bit
                              for DCH set position m to TFCI for DCH
        e₁ = e₁ + e_plus 1  -- update error
    end if
    if e₂ ≦ 0 then         -- check if bit number m should be TFCI bit
                              for DCH set position m to TFCI for DSCH
        e₂ = e₂ + e_plus 2  -- update error
    end if
    m = m + 1              -- next bit
end do
```

In the above pattern, the same results are obtained when the initial position is changed by an amount r, and this can be expressed as follows:

```
e_ini1 = e_ini1 - e_minus1 * r
e_ini2 = e_ini2 - e_minus2 * r
do while e_ini1 < 0
    e_ini1 = e_ini1 + e_plus1
end
do while e_ini2 < 0
    e_ini2 = e_ini2 + e_plus2
end
```

If $i_1$ and $i_2$ are exchanged, $j_1$ and $j_2$ are changed such that the bit patterns of FIG. 4 can be obtained. Namely, the positions of the bits that indicate TFCI1 and TFCI2 have changed, but the same bit pattern can be generated.

Next, FIG. 5 is a table showing additional exemplary transmission patterns of each type of TFCI1 to TFCI2 ratio for transmitting TFCI code words.

To generate the TFCI code word mapping patterns of FIG. 5, the eighth embodiment of the present invention employs Equations 9a and 9b to obtain $j_1$ and $j_2$ as follows:

$$j_1 = \left\lfloor \frac{32}{32-(3k+1)} \times \left(i_1 + \frac{1}{2}\left\lfloor \frac{k}{6} \right\rfloor\right) + \frac{1}{2} \right\rfloor \quad (9a)$$

$$j_2 = \left\lfloor \frac{32}{3k+1} \times \left(i_2 + \frac{1}{2}\left(1 - \left\lfloor \frac{k}{6} \right\rfloor\right)\right) + \frac{1}{2} \right\rfloor \quad (9b)$$

Here, $i_1=0, \ldots, 30-3k$ and $i_2=0, \ldots, 3k$, whereby, "k" indicates the total number of corresponding TFCI1 bits. In equations 9a and 9b above, the invalid bit positions (i.e., bit positions greater than 31 when k=6 or k=7) are prevented from being generated In the ninth embodiment of the present invention, $j_1$ and $j_2$ are obtained by the following Equations 10a and 10b.

$$j_1 = i_1 + \left\lfloor \frac{3k+1}{32-(3k+1)} \times \left(i_1 + \frac{1}{2}\right) + \frac{16}{32-(3k+1)} \left\lfloor \frac{k}{6} \right\rfloor \right\rfloor \quad (10a)$$

$$j_2 = \left\lfloor \frac{32}{3k+1} \times \left(i_2 + \frac{1}{2}\left(1 - \left\lfloor \frac{k}{6} \right\rfloor\right)\right) + \frac{1}{2} \right\rfloor \quad (10b)$$

Here, $i_1=0, \ldots, 30-3k$ and $i_2=0, \ldots, 3k$, whereby, "k" indicates the total number of corresponding TFCI1 bits. Invalid bit positions (i.e., bit positions greater than 31 when k=6 or k=7) are prevented from being generated.

In the tenth embodiment of the present invention, $j_1$ and $j_2$ are obtained by the following Equations 11a and 11b.

$$j_1 = \left\lfloor \frac{32}{32-(3k+1)} \times \left(i_1 + \frac{1}{2}\left\lfloor \frac{k}{5} \right\rfloor\right) + \frac{1}{2} \right\rfloor \quad (11a)$$

$$j_2 = \left\lfloor \frac{32}{3k+1} \times \left(i_2 + \frac{1}{2}\left(1 - \left\lfloor \frac{k}{5} \right\rfloor\right)\right) + \frac{1}{2} \right\rfloor \quad (11b)$$

Here, $i_1=0, \ldots, 30-3k$ and $i_2=0, \ldots, 3k$, whereby, "k" indicates the total number of corresponding TFCI1 bits. The invalid bit positions (i.e., bit positions greater than 31 when k=6 or k=7) are again prevented from being generated.

In the eleventh embodiment of the present invention, $j_1$ and $j_2$ are obtained by the following Equations 12a and 12b.

$$j_1 = i_1 + \left\lfloor \frac{3k+1}{32-(3k+1)} \times \left(i_1 + \frac{1}{2}\right) + \frac{16}{32-(3k+1)} \left\lfloor \frac{k}{5} \right\rfloor \right\rfloor \quad (12a)$$

$$j_2 = \left\lfloor \frac{32}{3k+1} \times \left(i_2 + \frac{1}{2}\left(1 - \left\lfloor \frac{k}{5} \right\rfloor\right)\right) + \frac{1}{2} \right\rfloor \quad (12b)$$

Here, $i_1=0, \ldots, 30-3k$ and $i_2=0 \ldots, 3k$, whereby, "k" indicates the total number of corresponding TFCI1 bits. Again, the invalid bit positions (i.e., bit positions greater than 31 when k=6 or k=7) are prevented from being generated.

In the twelfth embodiment of the present invention, $j_1$ and $j_2$ are obtained in the following manner.

If X=32, $e_{plus}$=32, $e_{minus1}$=32-(k*3+1), $e_{minus2}$=k*3+1, $e_{ini1}$=16*(1+floor(k/6))-(32-(k*3+1))/2, and $e_{ini2}$=16*(1-floor(k/6))-(k*3+1)/2, then the algorithm as shown previously in the eighth embodiment is used to determine the TFCI1 and TFCI2 positions. Here, it should be noted that all the above parameters, except for $e_{ini2}$, are the same as those of the previously described eighth embodiment.

In addition, it is noted that a new separate TFCI encoder is not needed to implement the present invention. Rather, the positions are of the bits may be calculated using an exiting encoder and the bit positions being calculated as noted above.

Accordingly, optimal bit positions for TFCI1 and TFCI2 can be obtained using the above-identified equations or any combination thereof. Also, in the above equations, if k/6 is replaced with k/5, the bit positions of the TFCI1 related to the DPCH and bit positions of the TFCI2 related to the DSCH are exchanged with each other for a TFCI code word having a TFCI1 to TFCI2 ratio of 5:5. Namely, for a TFCI1 to TFCI2 ratio of 5:5, the TFCI1 bits and the TFCI2 bits alternate.

In summary, the TFCI code transmission scheme according to the present invention maps TFCI1 and TFCI2 to optimal code word patterns so that TFCI code word errors are minimized, and thus communication reliability can be significantly improved over the related art techniques.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of coding a transport format combination indicator (TFCI) comprising:

calculating a TFCI coded word 1 and a TFCI coded word 2 using a first set of bits (TFCI 1) and a second set of bits (TFCI 2); and determining bit positions ($j_1$, $j_2$) of the calculated TFCI coded word 1 and TFCI coded word 2, wherein bit positions ($j_1$) for the first set of bits and bit positions ($j_2$) for the second set of bits are calculated using the following equations:

$$j_1 = \left\lfloor \frac{32}{3k+1} \times \left( i_1 + 1 - \frac{1}{2}\left\lfloor \frac{k}{5} \right\rfloor \right) + \frac{1}{2} \right\rfloor - 1$$

$$j_2 = \left\lfloor \frac{32}{32-(3k+1)} \times \left( i_2 + \frac{1}{2}\left(1 + \left\lfloor \frac{k}{5} \right\rfloor \right) \right) + \frac{1}{2} \right\rfloor - 1$$

where $i_1 = 0, \ldots, 3k$, $i_2 = 0, \ldots, 30-3k$, and "k" indicates a number of bits for the TFCI.

2. The method of claim 1, further comprising:
outputting the TFCI coded word 1 and TFCI coded word 2 based on the determined bit positions ($j_1$, $j_2$).

3. The method of claim 1, wherein the bit positions are those bits positions having values between 0 and 31.

4. The method of claim 1, wherein the first set of bits is for a dedicated physical channel (DPCH), and the second set of bits is for a downlink shared channel (DSCH).

5. The method of claim 1, further comprising:
transmitting the TFCI code words for a radio frame over a physical channel.

6. The method of claim 1, wherein bit positions ($j_1$) for the first set of bits and bit positions ($j_2$) for the second set of bits are also calculated using the following equations:

$$j_1 = \left\lfloor \frac{32}{32-(3k+1)} \times \left( i_1 + \frac{1}{2}\left(1 + \left\lfloor \frac{k}{6} \right\rfloor \right) \right) + \frac{1}{2} \right\rfloor - 1$$

$$j_2 = \left\lfloor \frac{32}{3k+1} \times \left( i_2 + 1 - \frac{1}{2}\left\lfloor \frac{k}{6} \right\rfloor \right) + \frac{1}{2} \right\rfloor - 1$$

where $i_1 = 0, \ldots, 3k$, $i_2 = 0, \ldots, 30-3k$, and "k" indicates a number of bits for the TFCI.

7. The method of claim 1, wherein bit positions ($j_1$) for the first set of bits and bit positions ($j_2$) for the second set of bits are also calculated using the following equations:

$$j_1 = \left\lfloor \frac{32}{32-(3k+1)} \times \left( i_1 + \frac{1}{2}\left(1 + \left\lfloor \frac{k}{6} \right\rfloor \right) \right) + \frac{1}{2} \right\rfloor$$

$$j_2 = \left\lfloor \frac{32}{3k+1} \times \left( i_2 + 1 - \frac{1}{2}\left\lfloor \frac{k}{6} \right\rfloor \right) - \frac{1}{2} \right\rfloor$$

where $i_1 = 0, \ldots, 3k$, $i_2 = 0, \ldots, 30-3k$, and "k" indicates a number of bits for the TFCI.

8. The method of claim 1, wherein bit positions ($j_1$) for the first set of bits and bit positions ($j_2$) for the second set of bits are also calculated using the following equations:

$$j_1 = i_1 + \left\lfloor \frac{3k+1}{32-(3k+1)} \times \left( i_1 + \frac{1}{2} \right) + \frac{16}{32-(3k+1)}\left\lfloor \frac{k}{6} \right\rfloor \right\rfloor$$

$$j_2 = \left\lfloor \frac{32}{3k+1} \times \left( i_2 + 1 - \frac{1}{2}\left\lfloor \frac{k}{6} \right\rfloor \right) + \frac{1}{2} \right\rfloor - 1$$

where $i_1 = 0, \ldots, 3k$, $i_2 = 0, \ldots, 30-3k$, and "k" indicates a number of bits for the TFCI.

9. The method of claim 1, wherein bit positions ($j_1$) for the first set of bits and bit positions ($j_2$) for the second set of bits are also calculated using the following equations:

$$j_1 = \left\lfloor \frac{32}{32-(3k+1)} \times \left( i_1 + \frac{1}{2}\left(1 + \left\lfloor \frac{k}{5} \right\rfloor \right) \right) + \frac{1}{2} \right\rfloor - 1$$

-continued $$j_2 = \left\lfloor \frac{32}{3k+1} \times \left(i_2 + 1 - \frac{1}{2}\left\lfloor \frac{k}{5}\right\rfloor\right) + \frac{1}{2}\right\rfloor - 1$$

where $i_1=0, \ldots, 3k$, $i_2=0, \ldots, 30-3k$, and "k" indicates a number of bits for the TFCI.

10. The method of claim 1, wherein bit positions ($j_1$) for the first set of bits and bit positions ($j_2$) for the second set of bits are also calculated using the following equations:

$$j_1 = \left\lfloor \frac{32}{3k+1} \times \left(i_1 + 1 - \frac{1}{2}\left\lfloor \frac{k}{5}\right\rfloor\right) + \frac{1}{2}\right\rfloor - 1$$

$$j_2 = \left\lfloor \frac{32}{32-(3k+1)} \times \left(i_2 + \frac{1}{2}\left(1 + \left\lfloor \frac{k}{5}\right\rfloor\right)\right) + \frac{1}{2}\right\rfloor - 1$$

where $i_1=0, \ldots, 3k$, $i_2=0, \ldots, 30-3k$, and "k" indicates a number of bits for the TFCI.

11. The method of claim 1, wherein bit positions ($j_1$) for the first set of bits and bit positions ($j_2$) for the second set of bits are also calculated using the following equations:

$$j_1 = \left\lfloor \frac{32}{32-(3k+1)} \times \left(i_1 + \frac{1}{2}\left(1 + \left\lfloor \frac{k}{5}\right\rfloor\right)\right) - \frac{1}{2}\right\rfloor$$

$$j_2 = \left\lfloor \frac{32}{(3k+1)} \times \left(i_2 + 1 - \frac{1}{2}\left\lfloor \frac{k}{5}\right\rfloor\right) - \frac{1}{2}\right\rfloor$$

where $i_1=0, \ldots, 3k$, $i_2=0, \ldots, 30-3k$, and "k" indicates a number of bits for the TFCI.

12. The method of claim 1, wherein the first set of bits ($j_1$) and the second set of bits ($j_2$) are also calculated using the following equations:

$$j_1 = i_1 + \left\lfloor \frac{3k+1}{32-(3k+1)} \times \left(i_1 + \frac{1}{2}\right) + \frac{16}{32-(3k+1)}\left\lfloor \frac{k}{5}\right\rfloor\right\rfloor$$

$$j_2 = \left\lfloor \frac{32}{(3k+1)} \times \left(i_2 + 1 - \frac{1}{2}\left\lfloor \frac{k}{5}\right\rfloor\right) + \frac{1}{2}\right\rfloor - 1$$

where $i_1=0, \ldots, 3k$, $i_2=0, \ldots, 30-3k$, and "k" indicates a number of bits for the TFCI.

13. The method of claim 1, wherein bit positions ($j_1$) for the first set of bits and bit positions ($j_2$) for the second set of bits are also calculated using the following equations:

$$j_1 = \left\lfloor \frac{32}{32-(3k+1)} \times \left(i_1 + \frac{1}{2}\left\lfloor \frac{k}{6}\right\rfloor\right) + \frac{1}{2}\right\rfloor$$

$$j_2 = \left\lfloor \frac{32}{(3k+1)} \times \left(i_2 + \frac{1}{2}\left(1 - \left\lfloor \frac{k}{6}\right\rfloor\right)\right) + \frac{1}{2}\right\rfloor$$

where $i_1=0, \ldots, 3k$, $i_2=0, \ldots, 30-3k$, and "k" indicates a number of bits for the TFCI.

14. The method of claim 1, wherein bit positions ($j_1$) for the first set of bits and bit positions ($j_2$) for the second set of bits are also calculated using the following equations:

$$j_1 = i_1 + \left\lfloor \frac{3k+1}{32-(3k+1)} \times \left(i_1 + \frac{1}{2}\right) + \frac{16}{32-(3k+1)}\left\lfloor \frac{k}{6}\right\rfloor\right\rfloor$$

$$j_2 = \left\lfloor \frac{32}{3k+1} \times \left(i_2 + \frac{1}{2}\left(1 - \left\lfloor \frac{k}{6}\right\rfloor\right)\right) + \frac{1}{2}\right\rfloor$$

where $i_1=0, \ldots, 3k$, $i_2=0, \ldots, 30-3k$, and "k" indicates a number of bits for the TFCI.

15. The method of claim 1, wherein bit positions ($j_1$) for the first set of bits and bit positions ($j_2$) for the second set of bits are also calculated using the following equations:

$$j_1 = \left\lfloor \frac{32}{32-(3k+1)} \times \left(i_1 + \frac{1}{2}\left\lfloor \frac{k}{5}\right\rfloor\right) + \frac{1}{2}\right\rfloor$$

$$j_2 = \left\lfloor \frac{32}{3k+1} \times \left(i_2 + \frac{1}{2}\left(1 - \left\lfloor \frac{k}{5}\right\rfloor\right)\right) + \frac{1}{2}\right\rfloor$$

where $i_1=0, \ldots, 3k$, $i_2=0, \ldots, 30-3k$, and "k" indicates a number of bits for the TFCI.

16. The method of claim 1, wherein bit positions ($j_1$) for the first set of bits and bit positions ($j_2$) for the second set of bits are also calculated using the following equations:

$$j_1 = i_1 + \left\lfloor \frac{3k+1}{32-(3k+1)} \times \left(i_1 + \frac{1}{2}\right) + \frac{16}{32-(3k+1)}\left\lfloor \frac{k}{5}\right\rfloor\right\rfloor$$

$$j_2 = \left\lfloor \frac{32}{3k+1} \times \left(i_2 + \frac{1}{2}\left(1 - \left\lfloor \frac{k}{5}\right\rfloor\right)\right) + \frac{1}{2}\right\rfloor$$

where $i_1=0, \ldots, 3k$, $i_2=0, \ldots, 30-3k$, and "k" indicates a number of bits for the TFCI.

17. A transport format combination indicator (TFCI) encoder for a communication device, the device comprises:

a calculating unit adapted to calculate valid bit positions ($j_1$, $j_2$) for a first set of bits (TFCI 1) and a second set of bits (TFCI 2) respectively; and a TFCI coding unit adapted to form a TFCI coded word 1 and a TFCI coded word 2 using the TFCI 1 and TFCI 2 according to the valid bit positions calculated by the calculating unit, wherein bit positions ($j_1$) for the first set of bits and bit positions ($j_2$) for the second set of bits are calculated using the following equations:

$$j_1 = \left\lfloor \frac{32}{3k+1} \times \left(i_1 + 1 - \frac{1}{2}\left\lfloor \frac{k}{5}\right\rfloor\right) + \frac{1}{2}\right\rfloor - 1$$

$$j_2 = \left\lfloor \frac{32}{32-(3k+1)} \times \left(i_2 + \frac{1}{2}\left(1 + \left\lfloor \frac{k}{5}\right\rfloor\right)\right) + \frac{1}{2}\right\rfloor - 1$$

where $i_1=0, \ldots, 3k$, $i_2=0, \ldots, 30-3k$, and "k" indicates a number of bits for the TFCI.

* * * * *